United States Patent Office 2,964,542
Patented Dec. 13, 1960

2,964,542

11-OXYGENATED-6-METHYL-9α-FLUORO-PREGNADIENES AND ESTERS THEREOF

George B. Spero, Kalamazoo, Mich., assignor to The Upjohn Company, Kalamazoo, Mich., a corporation of Delaware No Drawing. Filed July 27, 1959, Ser. No. 829,517

6 Claims. (Cl. 260—397.45)

The present invention relates to steroids and is more particularly concerned with 1-dehydro-6-methyl-9α-fluorohydrocortisone, 1 - dehydro - 6 - methyl - 9α - fluorocortisone, the 21-esters thereof and a process for the production thereof.

This application is a continuation-in-part of application Serial No. 624,965, filed November 29, 1956, and now abandoned.

The compounds and the process of the present invention are illustratively represented by the following sequence of formulae:

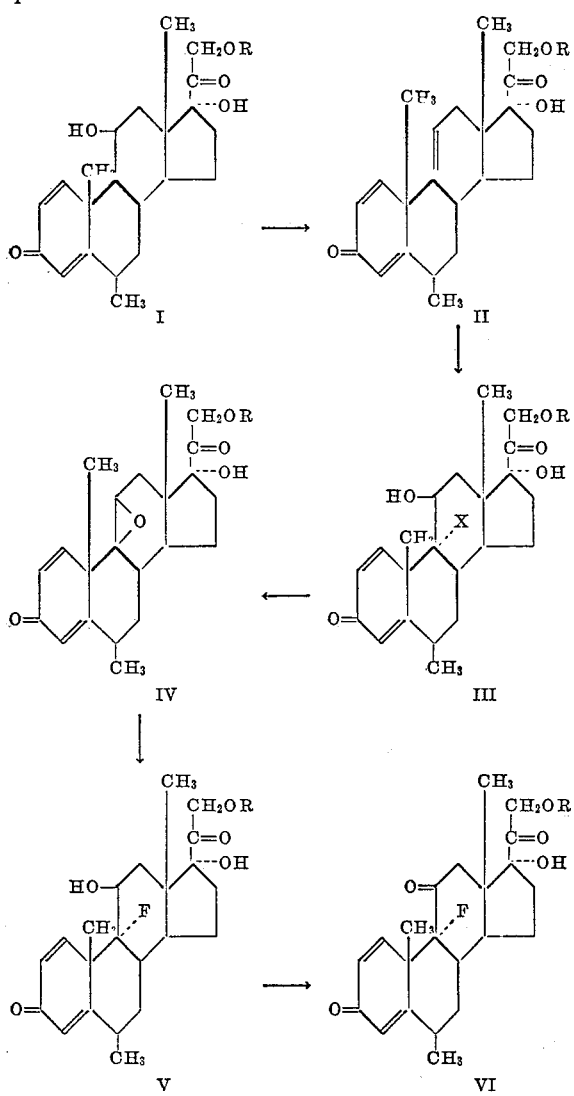

wherein X is a halogen of atomic number between seventeen and 35, inclusive, and R is selected from the group consisting of hydrogen and acyl, wherein the acyl radical is selected from the group consisting of organic carboxylic acids, preferably hydrocarbon carboxylic acids containing from one to twelve carbon atoms, inclusive, and methanesulfonic acid.

The process of the present invention comprises: dehydrating a 1-dehydro-6-methylhydrocortisone 21-ester or the free alcohol (I) illustratively with sulfuric acid or preferably with a hypohalous acid and then with anhydrous sulfur dioxide to obtain the corresponding 6-methyl-17α,21 - dihydroxy - 1,4,9(11) - pregnatriene - 3,20 - dione 21-ester or respectively the free alcohol (II). Addition of a hypohalous acid such as hypochlorous or hypobromous acid results in 6-methyl-9α-halo-11β,17α,21-trihydroxy-1,4-pregnadiene-3,20-dione acylate or the free alcohol (III), which by treatment with a base such as anhydrous potassium acetate yields the epoxy compound 6-methyl-9β,11β-oxido-17α,21-dihydroxy-1,4-pregnadiene-3,20-dione 21-acylate or, respectively, the unesterified product, both represented by Formula IV. Treatment of the epoxy compound (IV) with hydrogen fluoride or other hydrogen fluoride releasing agents provides the physiologically-active fluoro derivative, 6-methyl-9α-fluoro-11β,17α, 21-trihydroxy-1,4-pregnadiene-3,20 dione 21-acylate or the free triol 1-dehydro-6-methyl-9α-fluorohydrocortisone, represented by Formula V. Oxidation of the esterified compound (V) with chromic acid in acetic acid provides the 6-methyl-9α-fluoro-17α,21-dihydroxy-1,4-pregnadiene-3,11,20-trione 21-acylate (VI). Hydrolysis of the ester VI with a base provides the free alcohol 6-methyl-17α,21-dihydroxy - 1,4 - pregnadiene - 3,11,20 - trione (1 - dehydro - 6 - methyl - 9α - fluorocortisone).

It is an object of the instant invention to provide the new adrenocortical hormones, 1 - dehydro - 6 - methyl-9α - fluorohydrocortisone, 1 - dehydro - 6 - methyl - 9α-fluorocortisone and the 21-esters thereof, in particular in the 6α-epimeric form. It is another object of the instant invention to provide a method for the production of 1-dehydro - 6 - methyl - 9α - fluorohydrocortisone, 1 - dehydro - 6 - methyl - 9α - fluorocortisone and the 21 - esters thereof. It is an additional object of the instant invention to provide the intermediates for the production of these adrenocortically active compounds, such as 6-methyl - 17α,21 - dihydroxy - 1,4,9(11) - pregnatriene-3,20 - dione 21 - acylate, 6 - methyl - 9(11) - oxido - 17α, 21 - dihydroxy - 1,4 - pregnadiene - 3,20 - dione 21-acylate, the 9α - chloro- and 9α - bromo - 6 - methyl-11β,17α,21 - trihydroxy - 1,4 - pregnadiene - 3,20 - dione 21-acylates and the free alcohols thereof. Other objects of this invention will be apparent to those skilled in the art to which this invention pertains.

The novel 1 - dehydro - 6 - methyl - 9α - fluorohydrocortisone, the 1 - dehydro - 6 - methyl - 9α - fluorocortisone and the 21-esters thereof, in particular the 6α-epimers thereof, i.e., 1 - dehydro - 6α - methyl - 9α-fluorohydrocortisone and 1 - dehydro - 6α - methyl - 9α-fluorocortisone, are very active adrenal cortical hormones possessing anti-inflammatory activity of an extremely high order and possessing improved therapeutic ratio. They are thus useful in parenteral and topical compositions and may be given as tablets for oral use in combination with such binding materials and carriers as polyethylene glycol 4000 or 6000, lactose, sucrose, and the like. Especially useful is the 1 - dehydro - 6α - methyl - 9α - fluorohydrocortisone and esters thereof for this purpose. In topical application the substances an be used as ointments, lotions, jellies, creams, suppositories, bougies, aqueous suspensions, and the like. Instead of the 1 - dehydro-6α - methyl - 9α - fluorohydrocortisone or 1 - dehydro-6α - methyl - 9α - fluorocortisone, the 6β - epimers thereof can be used in therapeutically equivalent amounts to give the same final results.

The starting materials of the instant invention are the 1-dehydro-6α-methylhydrocortisone esters as described in Preparations 1 through 14. Instead of the 1-dehydro-6α-methylhydrocortisone, the 6β-epimer can be used to give the corresponding 1-dehydro-6β-methyl-9α-fluorohydrocortisone and the 1-dehydro-6β-methyl-9α-fluorocortisone.

In carrying out the process of the instant invention, 6-methyl-11β,17α,21-trihydroxy-1,4,pregnadiene-3,20-dione 21-acylate (1-dehydro-6-methylhydrocortisone 21-acylate) is dehydrated to the corresponding 21-acylate of 6-methyl-17α,21-dihydroxy-1,4,9(11)-pregnatriene-3,20-dione by methods known in the art, for example, by a dehydrating agent such as phosphorus oxychloride, hydrochloric acid or sulfuric acid and acetic acid, or pyrolysis as shown by U.S. Patents 2,640,838 and 2,640,839. In the preferred embodiment of the present invention the dehydration is effected by reacting the 11β-hydroxy compound with an N-haloamide or N-haloimide in an organic base and treating the thus produced intermediate 11-hypohalite with dry sulfur dioxide in an organic base. As reagents for the production of an 11-hypohalite, the N-haloamide or N-haloimide are used wherein the halogen has an atomic number from 17 to 53, inclusive, preferably chlorine or bromine. Examples of such compounds are N-chloroacetamide, N-bromoacetamide, N-chlorosuccinimide, N-bromosuccinimide, N-iodosuccinimide, 3-bromo-5,5-dimethylhydantoin and 1,3-dibromo-5,5-dimethylhydantoin. Ordinarily an amount in excess of a molar equivalent, calculated on the starting 11β-hydroxy steroid, is employed. The bases employed in the production of the 11-hypohalite are tertiary amines wherein the amino nitrogen is a member of an aromatic ring, for example, the pyridines, that is, pyridine, alkyl-pyridines, piccoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents, and is preferably the sole reaction solvent. The reaction to produce an 11-hypohalite is generally conducted under anhydrous conditions preferably containing less than 0.1 molar equivalent of water calculated per mole of steroid. Large proportions of water decrease the yield. The temperature of the reaction is between minus forty and plus seventy degrees centigrade, the lower limit being determined by the solubility of the reagents in the solvents and the upper limit being determined by the amount of side reaction which normally accompanies the reaction involving any halo compounds at higher temperatures. Ordinarily, room temperature (twenty to thirty degrees centigrade) is preferred for convenience and the consistently high yields of the desired product which are obtained at this temperature. A reaction period between five minutes to three hours is usually employed, at higher temperatures—above thirty degrees centigrade—short reaction times are sufficient to produce completeness of the reaction.

The thus produced 6-methyl-11β,17α,21-trihydroxy-1,4-pregnadiene-3,20-dione 11β-hypohalite, 21-acylate is then treated with anhydrous sulfur dioxide in the presence of an organic base as described hereinbefore. The anhydrous sulfur dioxide can be in the form of gaseous or liquid sulfur dioxide or in the form of a material which in situ produces sulfur dioxide, for example, alkali metal hyposulfite. The reaction temperature ranges substantially within minus forty and plus seventy degrees centigrade and preferably room temperature (twenty to thirty degrees centigrade). The thus obtained product, a 6-methyl-17α,21-dihydroxy-1,4,9(11)-pregnatriene-3,20-dione 21-acylate, is isolated from the reaction mixture by conventional means such as extraction after the reaction mixture has been poured into excess of water. Organic water-immiscible solvents such as ether, chloroform, methylene chloride, carbon tetrachloride, ethyl acetate, benzene, hexanes, or the like, are used for the extraction. The thus obtained extracts are conveniently washed, dried and thereupon evaporated to give the crude 6-methyl-17α,21-dihydroxy-1,4,9(11)-pregnatriene-3,20-dione 21-ester which is purified by conventional means such as recrystallization or chromatography, as deemed necessary.

The thus obtained 6-methyl-17α,21-dihydroxy-1,4,9(11)-pregnatriene-3,20-dione 21-acylate is converted to 6-methyl-9α-halo-11β,17α,21-trihydroxy-1,4-pregnadiene-3,20-dione 21-acylate by adding a hypohalous acid such as hypochlorous or hypobromous acid. The hypohalous acid is usually added by reacting an N-halo acid amide or an N-halo acid imide with an acid to produce the hypohalous acid in situ. In the preferred embodiment of the invention, the steriod, a 6-methyl-17α,21-dihydroxy-1,4,9(11)-pregnatriene-3,20-dione 21-ester is dissolved in an organic solvent such as methylene chloride, tertiary butyl alcohol, dioxane, tertiary amyl alcohol, or the like, and reacted at room temperature with the hypobromous or hypochlorous acid releasing agent in the presence of an acid. Such hypohalous acid releasing agents include the N-bromoacetamide, the N-chloroacetamide, the N-bromosuccinimide, the N-iodosuccinimide, or the like, in the presence of water and an acid such as perchloric acid, dilute sulfuric acid, or the like. The reaction is usually carried out at room temperature, between fifteen to thirty degrees centigrade, however, lower or higher temperatures are operative for the process. The hypohalous acid releasing agent is generally used in one molar or slightly increased, for example, 25 percent increased amounts compared to mole of steriod. A large excess of the hypohalous acid releasing agent while operative is undesirable since the excess of hypohalous acid has a tendency to react on other positions of the molecule. The reaction period is rather short and may vary between about four to five minutes to one hour. At the end of the reaction time excess of hypohalous acid is destroyed by the addition of sodium sulfite or other sulfites or hydrosulfites. The thus produced product, a 6-methyl-9α-halo-11β,17α,21-trihydroxy-1,4-pregnadiene-3,20-dione 21-acylate, wherein the halogen atom is of atomic weight between 33 and 130 (atomic number 17 to 53), is isolated from the reaction mixture by adding excess of water and extracting the compound with organic solvents or by recovering the precipitated compound through filtration. The crude product thus obtained may be recrystallized from organic solvents, such as acetone, Skellysolve B hexane hydrocarbons or the like to give pure 6-methyl-9α-halo-11β,17α,21-trihydroxy-1,4-pregnadiene-3,20-dione 21-acylate.

The ester thus obtained can be hydrolyzed to give the free triol, 6-methyl-9α-halo-11β,17α,21-trihydroxy-1,4-pregnadiene-3,20-dione, which can be reesterified.

Oxidizing the 21-ester of a 6-methyl-9α-halo-11β,17α,21-trihydroxy-1,4-pregnadiene-3,20-dione 21-acylate with chromic acid produces the corresponding pharmaceutically active 6-methyl-9α-halo-17α,21-dihydroxy-1,4-pregnadiene-3,11,20-trione 21-acylate which by hydrolysis gives the free triol 6-methyl-9α-halo-17α,21-dihydroxy-1,4-pregnadiene-3,11,20-trione.

In order to obtain the 9α-fluoro compounds, the 9β,11β-epoxy intermediates of the before-mentioned compounds, 6-methyl-9β,11β-oxido-17α,21-dihydroxy-1,4-pregnadiene-3,20-dione 21-esters, are prepared. In carrying out this reaction a 6-methyl-9α-halo-11β,17α,21-trihydroxy-1,4-pregnadiene-3,20-dione 21-ester is heated in solution with a mild base, and preferably in the absence of water to avoid hydrolysis of the ester groups.

The bases useful for the cyclization include anhydrous potassium acetate, sodium bicarbonate, sodium acetate, or the like, with potassium acetate preferred. Solvents such as methanol, ethanol, acetone, tertiary butyl alcohol, or the like, may be used. The reaction time is between one half hour and 24 hours; generally a period between three and twelve hours is sufficient. The thus obtained 6 - methyl - 9β,11β - oxido - 17α,21 - dihydroxy - 1,4-pregnadiene-3,20-dione 21-acylate is isolated from the reaction mixture by diluting the reaction mixture with excess water and filtering the product when crystalline, or by extracting with methylene chloride or other water-immiscible solvents such as ether, Skellysolve B hexanes, pentanes, benzene, ethyl acetate, chloroform, carbon tetrachloride, or the like. Evaporation of the solvent of the extracts produces the 6-methyl-9β,11β-oxido-17α,21-dihydroxy-1,4-pregnadiene-3,20-dione 21-acylate.

The thus obtained 6-methyl-9β,11β-oxido-17α,21-dihydroxy-1,4-pregnadiene-3,20-dione 21-acylate is thereupon reacted with 48 percent hydrofluoric acid in solution. As solvents for this reaction methylene chloride, ethylene dichloride, chloroform, carbon tetrachloride or the like is useful, with methylene chloride preferred. The reaction is carried out at room temperature (twenty to thirty degrees centigrade) preferably with stirring. The period of reaction is from one to 24 hours with a period from one to twelve hours usually sufficient. After the reaction is terminated, the mixture is poured into water and neutralized with a dilute base such as sodium bicarbonate, potassium bicarbonate, or the like. Excess of strong bases can also be used. The reaction mixture is then extracted with a water-immiscible solvent such as methylene chloride, the organic layer is separated from the water mixture, washed with water, dried and evaporated to give the crude 6-methyl-9α-fluoro-11β,17α,21-trihydroxy - 1,4 - pregnadiene - 3,20 - dione 21 - acylate. The thus obtained crude compound may be purified through recrystallization or chromatography.

The 6-methyl-9α-fluoro-11β,17α,21-trihydroxy-1,4-pregnadiene-3,20-dione 21-esters obtained by this process can be hydrolyzed to give the 6-methyl-9α-fluoro-11β,17α,21-trihydroxy-1,4-pregnadiene-3,20-dione which can be re-esterified, if desired, with acyl halides or acid anhydrides, in pyridine solution at room temperature to give other 21-esters of 6-methyl-9α-fluoro-11β,17α,21-trihydroxy-1,4-pregnadiene-3,20-dione (1-dehydro-6-methyl-9α-fluorohydrocortisone).

Oxidation of the 6-methyl-9α-fluoro-11β,17α,21-trihydroxy-1,4-pregnadiene-3,20-dione 21-acylate with chromic acid produces the corresponding 6-methyl-9α-fluoro-17α, 21 - dihydroxy - 1,4 - pregnadiene - 3,11,20 - trione 21-acylate which can be hydrolyzed illustratively with a base e.g., with sodium carbonate in ethanol in a nitrogen atmosphere to give the free diol, 6-methyl-9α-fluoro-17α, 21-dihydroxy-1,4-pregnadiene-3,11,20-trione.

Using 6-methylhydrocortisone 21-acylate instead of the 1-dehydro-6-methylhydrocortisone 21-acylate in the above sequence of reactions provides the 6-methyl-9α-fluorohydrocortisone and 6-methyl-9α-fluorocortisone and their 21-esters which compounds have strong anti-inflammatory and glucocorticoid activity. Both 6-methyl-9α-fluorohydrocortisone and 6-methyl-9α-fluorocortisone are therefore useful for topical uses as ointments for inflammatory conditions, or internally, as tablets, for arthritic symptoms. Similarly, by using other 6-alkyl- or 6-phenyl-1-dehydrohydrocortisones as starting material, the corresponding 1-dehydro-6-alkyl-9α-fluorohydrocortisones, 1-dehydro-6-alkyl-9α-fluorocortisones, the esters thereof and the 6-aryl analogues thereof are obtained, wherein the alkyl group is, for example, ethyl, propyl, isopropyl, butyl, isobutyl, pentyl, hexyl, or the like and the aryl group is, for example, phenyl.

The following preparations and examples are illustrated for the process and products of the present invention, but are not to be construed as limiting.

PREPARATION 1

*5α,6α - oxido - 11β,17α,21 - trihydroxyallopregnane-3,20-dione 3,20-bis-(ethylene ketal)*

To a solution of 0.901 gram of 11β,17α,21-trihydroxy-5-pregnene-3,20-dione 3,20-bis-(ethylene ketal) in eighteen milliliters of chloroform was added a solution of 331 milligrams of perbenzoic acid in 5.19 milliliters of chloroform. The resulting solution was allowed to stand in the refrigerator (ca. four degrees centigrade) for a period of 24 hours and thereupon at room temperature for an additional period of 72 hours. The reaction solution was then washed with five percent sodium bicarbonate solution and water, dried over anhydrous sodium sulfate and evaporated to dryness to give 1.031 grams of crude solid. Recrystallization from acetone gave 431 milligrams of material of melting point 230 to 247 degrees centigrade. The mother liquor, after evaporation to dryness, was dissolved in methylene chloride and chromatographed over 25 grams of acid washed alumina. The column was developed with three fractions each of methylene chloride plus five, ten, fifteen, twenty, 25 and fifty percent acetone, acetone, and acetone plus five percent methanol. The acetone plus five percent methanol eluate gave an additional 279 milligrams of the high melting product. The high melting material, 5α,6α-oxido-11β,17α,21 - trihydroxy - allopregnane - 3,20 - dione 3,20-bis-(ethylene ketal) was three times recrystallized from acetone and methanol to give a pure product of melting point 263 to 268 degrees centigrade. Other eluate fractions of lower melting point contained the 5β,6β-isomer thereof.

In the same manner as shown in Preparation 1, other 5α,6α - oxido - 11β,17α,21 - trihydroxyallopregnane-3,20-dione 3,20-bis-(alkylene ketals) can be prepared by reacting hydrocortisone diketals, wherein the ketal group has been formed by reacting the steroid 3,20-dione with ethylene, propylene, 1,2-, 1,3-, or 2,3-butylene glycol or pentane, hexane, heptane, or octane-diols wherein the alcohol groups are in vicinal positions such as 1,2, 2,3, 3,4, or the like, or separated by one carbon atom such as 1,3, 2,4, 3,5, and the like, with an organic peracid such as performic, peracetic, perbenzoic, monoperphthalic acid, or the like. For the purpose of this invention, starting compounds having the ethylene ketal groups are preferred, since these ketals are generally more easily prepared in high yield than ketals produced by the reaction of the 3,20-diketo compounds with higher alkanediols.

PREPARATION 2

*5α,11β,17α,21-tetrahydroxy-6β-methylallopregnane-3,20-dione 3,20-bis-(ethylene ketal)*

A solution of 1.115 grams of 5α,6α-oxido-11β,17α,21-trihydroxyallopregnane-3,20-dione 3,20 - bis - (ethylene ketal) in 165 milliliters of tetrahydrofuran (the tetrahydrofuran being dried through distillation over lithium aluminum hydride) was added dropwise to a solution of 95 milliliters of methyl magnesium bromide in ether (methyl magnesium bromide having a four molar concentration). To this mixture was added 575 milliliters of benzene and the reaction mixture was thereupon allowed to stir and reflux for 26 hours. After cooling, the reaction mixture was poured into 700 milliliters of iced, saturated ammonium chloride solution, stirred for a period of thirty minutes, and the benzene layer separated from the aqueous layer. The aqueous phase was extracted with three 200-milliliter portions of ethyl actate and the extracts added to the benzene layer. The combined benzene-ethyl acetate solution was thereupon washed with water, dried over anhydrous sodium sulfate and evaporated to dryness to give 1.314 grams of crude solid. Trituration of this material with ether left 1.064 grams of crystalline product of melting point 221 to 230 degrees. Recrystallization of this material gave 5α,11β,17α,21-tetrahydroxy-6β-methylallopregnane-3,20-dione 3,20-bis-(ethylene ketal) of melting point 228 to 233 degrees and rotation $[\alpha]_D$ minus eleven degrees in chloroform.

*Analysis.*—Calcd. for $C_{26}H_{42}O_8$: C, 64.70; H, 8.77. Found: C, 64.29; H, 8.69.

PREPARATION 3

5α,11β,17α,21-tetrahydroxy-6β-ethylallopregnane-3,20-dione 3,20-bis-(ethylene ketal)

In the same manner as shown in Preparation 2, 5α,6α-oxido-11β,17α,21-trihydroxyallopregnane-3,20-dione 3,20-bis-(ethylene ketal), was reacted with ethyl magnesium bromide in ether solution to give the corresponding 5α,11β,17α,21-tetrahydroxy-6β-ethylallopregnane - 3,20 - dione 3,20-bis-(ethylene ketal).

In the same manner as shown in Preparations 2 and 3, other 5α,11β,17α,21-tetrahydroxy-6β-alkylallopregnane-3,20-dione 3,20-bis-(ethylene ketals) are prepared by reacting the corresponding 5α,6α-oxido-11β,17α,21-trihydroxyallopregnane-3,20-dione 3,20-bis-(ethylene ketal) with a metal alkyl or metal aryl more specifically an alkyl metal halide such as a Grignard reagent, for example, methyl, ethyl, propyl, isopropyl, butyl, isobutyl, pentyl, hexyl, and phenyl magnesium bromides and iodides or cadmium alkyl and calcium alkyl and phenyl bromides or iodides. Representative 6β-alkylated allopregnanes thus prepared include: 5α,11β,17α,21-tetrahydroxy-6β - propylallopregnane-3,20-dione 3,20-bis-(ethylene ketal), 5α,11β,17α,21-tetrahydroxy-6β-butylallopregnane-3,20-dione 3,20 - bis-(ethylene ketal), 5α,11β,17α,21-tetrahydroxy-6β-isobutylallopregnane-3,20-dione 3,20-bis-(ethylene ketal), 5α,11β,17α,21-tetrahydroxy-6β-pentylallopregnane-3,20-dione 3,20-bis-(ethylene ketal), 5α,11β,17α,21-tetrahydroxy-6β-hexylallopregnane-3,20-dione 3,20-bis-(ethylene ketal), 5α,11β,17α,21-tetrahydroxy-6β-phenylallopregnane - 3,20-dione 3,20-bis-(ethylene ketal), and the like.

PREPARATION 4

5α,11β,17α,21-tetrahydroxy-6β-methylallopregnane-3,20-dione

A solution was prepared containing 468 milligrams of 5α,11β,17α,21-tetrahydroxy-6β-methylallopregnane - 3,20-dione 3,20-bis-(ethylene ketal), 38 milliliters of methanol and 7.7 milliliters of 2 N sulfuric acid. This solution was refluxed for a period of thirty minutes, then neutralized with five percent dilute sodium bicarbonate solution (about 100 milliliters) and concentrated under reduced pressure at 55 degrees centigrade to about 35 milliliters of volume. A product crystallized upon cooling and was recovered by filtration. This product was recrystallized from acetone-Skellysolve B hexanes to give an analytical-pure sample of 5α,11β,17α,21-tetrahydroxy-6β-methylallopregnane-3,20-dione of melting point 240 to 244° C. (decomposition) and rotation [α]$_D$ plus forty degrees in dioxane.

*Analysis.*—Calcd. for $C_{22}H_{34}O_6$: C, 66.98; H, 8.69. Found: C, 66.84; H, 8.86.

PREPARATION 5

5α,11β,17α,21-tetrahydroxy-6β-ethylallopregnane-3,20-dione

In the same manner as shown in Preparation 4, 5α,11β,17α,21-tetrahydroxy-6β-ethylallopregnane-3,20 - dione 3,20-bis-(ethylene ketal) was hydrolyzed with dilute sulfuric acid in ethanol solution to give 5α,11β,17α,21-tetrahydroxy-6β-ethylallopregnane-3,20-dione.

In the same manner as shown in Preparations 4 and 5, hydrolysis of other 5α,11β,17α,21-tetrahydroxy-6β-alkylallopregnane-3,20-dione 3,20-bis-(ethylene ketals), as well as those 6β-alkylallopregnane-3,20-dione 3,20-bis-(ketals) wherein the ketal group is other than ethylene, gives the corresponding 5α,11β,17α,21-tetrahydroxy - 6β - alkylallopregnane-3,20-diones such as for example, 5α,11β,17α,21-tetrahydroxy-6β-propylallopregnane-3,20-dione, 5α,11β,17α,21-tetrahydroxy-6β-butylallopregnane-3,20-dione, 5α,11β,17α,21-tetrahydroxy-6β-isobutylallopregnane - 3,20-dione, 5α,11β,17α,21-tetrahydroxy-6β-pentylallopregnane-3,20-dione, 5α,11β,17α,21-tetrahydroxy-6β-hexylallopregnane-3,20-dione, 5α,11β,17α,21 - tetrahydroxy-6β-phenylallopregnane-3,20-dione and the like.

PREPARATION 6

6α-methylhydrocortisone

A stream of nitrogen was bubbled through a solution of 429 milligrams of 5α,11β,17α,21-tetrahydroxy-6β-methylallopregnane-3,20-dione contained in 100 milliliters of denatured absolute alcohol for a period of ten minutes. To this solution was added 4.3 milliliters of 0.1 normal sodium hydroxide solution which had likewise been treated with nitrogen. The mixture was allowed to stand in a nitrogen atmosphere for a period of eighteen hours and thereupon was acidified with acetic acid, and concentrated under reduced pressure at 55 degrees centigrade to dryness. The residue weighing 417 milligrams was recrystallized from acetone-Skellysolve B hexanes to give in two crops 249 milligrams of 6α-methylhydrocortisone melting between 184 and 194 degrees centigrade. An analytical sample was prepared melting at 203 to 208 degrees centigrade and consisting of 6α-methylhydrocortisone.

*Analysis.*—Calcd. for $C_{22}H_{32}O_5$: C, 70.18; H, 8.57. Found: C, 70.32; H, 8.50.

The mother liquors contained besides 6α-methylhydrocortisone, substantial amounts of 6β-methylhydrocortisone which can be isolated by recrystallization, papergram, countercurrent procedures and other means known in the art.

Esterification of 6α-methylhydrocortisone with acetic anhydride in pyridine at room temperature yielded 6α-methylhydrocortisone 21-acetate of melting point 213 to 214 degrees centigrade.

*Analysis.*—Calcd. for $C_{24}H_{34}O_6$: C, 68.87; H, 8.19. Found: C, 68.60; H, 8.41.

PREPARATION 7

6β-methylhydrocortisone

A solution was prepared containing 27.5 grams of 5α,11β,17α,21 - tetrahydroxy - 6β - methylallopregnane-3,20-dione in 6500 milliliters of ethanol denatured with methanol. The solution was freed of air oxygen by bubbling oxygen-free nitrogen through it for a period of fifteen minutes. To this solution was added a similarly air oxygen-free prepared solution of one-tenth normal sodium hydroxide (235 milliliters). The solution was allowed to stand at room temperature (about 22 to 24 degrees centigrade) in an inert nitrogen atmosphere for a period of twenty hours and was then acidified with fourteen milliliters of acetic acid. The thus obtained acid solution was evaporated at about fifty to sixty degrees centigrade in vacuo, the thus produced residue dissolved in 200 milliliters of ethyl acetate and 200 milliliters of water, the water layer separated from the organic layer and discarded, the organic layer washed with 350 milliliters of five percent aqueous sodium bicarbonate solution, then three times with water and thereupon dried over anhydrous sodium sulfate and concentrated to a volume of 180 milliliters. After cooling the 180 milliliters of solution in a refrigerator (about five degrees centigrade), the solution was filtered giving 11.9 grams of material. This material was redissolved in 500 milliliters of ethyl acetate, the ethyl acetate solution was concentrated to 150 milliliters, refrigerated as before to give 6.15 grams of crude 6β-methylhydrocortisone of melting point 220 to 223 degrees centigrade.

Recrystallization of the crude 6β-methylhydrocortisone three more times from ethyl acetate gave an analytical sample of 6β-methylhydrocortisone with melting point 223 to 227 degrees centigrade, rotation [α]$_D$ plus 105 degrees in acetone; ultraviolet absorption $$\lambda_{max.}^{95\% \text{ ethanol}} \ 243 \ m\mu; \ a_M = 14,500$$

*Analysis.*—Calcd. for $C_{22}H_{32}O_5$: C, 70.17; H, 8.57. Found: C, 70.54; H, 8.91.

PREPARATION 8

6α-ethylhydrocortisone

In the same manner as shown in Preparation 6, 5α,11β,17α,21 - tetrahydroxy - 6α - ethylallopregnane - 3,20-dione was treated with a solution of potassium hydroxide in methanol to give at room temperature 6α-ethylhydrocortisone of melting point 223 to 226 degrees centigrade and $\lambda_{max.}^{EtOH}$ 243; $\epsilon$ 14,525

In the same manner dehydrating with an alkali metal hydroxide in alcoholic solution other 5α,11β,17α,21-tetrahydroxy - 6β - alkylallopregnane - 3,20 - diones produced the corresponding 6α-alkyl-11β,17α,21-trihydroxy-6-alkyl-4-pregnene-3,20-diones such as 6α-propylhydrocortisone, 6α-butylhydrocortisone, 6α-isobutylhydrocortisone, 6α-pentylhydrocortisone, 6α-hexylhydrocortisone, 6α-phenylhydrocortisone and the like.

PREPARATION 9

1-dehydro-6α-methylhydrocortisone (6α-methyl-11β,17α,21-trihydroxy-1,4-pregnadiene-3,20-dione)

Six 100-milliliter portions of a medium in 250-milliliter Erlenmeyer flasks containing one percent glucose, two percent corn steep liquor (sixty percent solids) and tap water was adjusted to a pH of 4.9. This medium was sterilized for 45 minutes at fifteen pounds per square inch pressure and inoculated with a one to two day growth of Septomyxa affinis A.T.C.C. 6737. The Erlenmeyer flasks were shaken at room temperature at about 24 degrees centigrade for a period of three days. At the end of this period, this 600-milliliter volume was used as an inoculum for ten liters of the same glucose-cornsteep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. of air/min./10 l. of beer). After seventeen hours of incubation, when a good growth developed and the acidity rose to pH 6.7, two grams of 6α-methylhydrocortisone plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium (56 grams dry weight) was removed by filtration and the steroidal material was extracted from the beer with methylene chloride, the methylene extracts evaporated to dryness, and the resulting residue chromatographed over a Florisil synthetic magnesium silicate column. The column was packed with 200 grams of Florisil and was developed with five 400-milliliter fractions each of methylene chloride, Skellysolve B-acetone mixtures of 9:1, 8:2, 7:3, 1:1, and methanol. The fraction eluted with Skellysolve B-acetone (7:3) weighed 1.545 g. and on recrystallization from acetone gave, in three crops, 928 milligrams of product of melting point 210 to 235 degrees centigrade. The sample prepared for analysis melted at 245 to 247 degrees centigrade. Rotation $[\alpha]_D$ was plus 83 degrees in dioxane.

*Analysis.*—Calcd. for $C_{22}H_{30}O_5$: C, 70.56; H, 8.08. Found: C, 70.53; H, 7.94.

$\lambda_{max.}^{EtOH}$ 243, $\epsilon$=14,875

Infrared absorption in Nujol mineral oil suspension:

| | | | |
|---|---|---|---|
| OH | 3,430 | 3,330 | 3,180 cm.⁻¹ |
| 20-keto | 1,706 | | |
| conjugated 3-keto | 1,645 | | |
| Δ¹,⁴-double bond | 1,592 | | |

Instead of by fermentative dehydrogenation, 1-dehydro-6α-methylhydrocortisone or an ester thereof can be obtained by dehydrogenation of 6α-methylhydrocortisone or an ester thereof with selenium dioxide as illustrated in Preparation 10.

PREPARATION 10

1-dehydro-6α-methylhydrocortisone acetate

A mixture of seventy milligrams of 6α-methylhydrocortisone acetate in 4.5 milliliters of tertiary butyl alcohol and 0.45 milliliter of acetic acid and 24 milligrams of selenium dioxide was heated to 75 degrees centigrade and stirred for 24 hours. Thereafter another 24-milligram portion of selenium dioxide was added and heated to 75 degrees centigrade and stirring continued. Thereafter the mixture was cooled, filtered to remove the selenium dioxide and evaporated. Paper chromatography showed the residue to contain about fifty to 55 percent of 1-dehydro-6α-methylhydrocortisone acetate which can be recovered from the residue by recrystallization and chromatography.

Infrared absorption in Nujol mineral oil suspension:

| | | |
|---|---|---|
| OH | 3,400 | 3,280 cm.⁻¹ |
| 11- and 20-keto | 1,722 | 1,700 |
| conjugated 3-keto | 1,655 | |
| Δ¹,⁴-double bond | 1,611 | 1,597 |

PREPARATION 11

1-dehydro-6β-methylhydrocortisone

In the same manner given in Preparation 9 fermenting with Septomyxa affinis in a nutrient medium with crude 11β,21-dihydroxy-4,17(20)-pregnadien-3-one as promoter 6β-methylhydrocortisone yielded 1-dehydro-6β-methylhydrocortisone.

PREPARATION 12

In the manner shown in Preparation 11, by fermentation with microorganisms of the genera Corynebacterium, Didymella, Calonectria, Alternaria, Collectotrichum, Cylindrocarpon, Ophiobolus, Septomyxa, Fusarium, Listeria or Erysipelothrix:

(a) 6-ethylhydrocortisone (6α- or 6β-epimer) yielded the corresponding 1-dehydro-6-ethylhydrocortisone.

(b) 6-propylhydrocortisone yielded 1-dehydro-6-propylhydrocortisone.

(c) 6-butylhydrocortisone yielded 1-dehydro-6-butylhydrocortisone.

(d) 6-hexylhydrocortisone yielded 1-dehydro-6-hexylhydrocortisone.

(e) 6-phenylhydrocortisone yielded 1-dehydro-6-phenylhydrocortisone.

In the same manner as shown in Preparations 9 and 11, other 1-dehydro-6-alkyl- and 1-dehydro-6-arylhydrocortisones are produced by subjecting the corresponding 6-alkylated or 6-arylated hydrocortisone or the esters thereof to fermentation especially by Corynebacterium simplex or Septomyxa affinis in the absence or presence of steroidal promoters such as 3-ketobisnor-4-cholen-22-al, crude 11β,21-dihydroxy-1,4,17(20)-pregnatrien-3-one, 3-ketobisnor-4-cholenic acid and progesterone. Representative 1-dehydro-6α-alkyl- and 1-dehydro-6α-arylhydrocortisones thus produced include: 1-dehydro-6α-valerylhydrocortisone, 1-dehydro-6α-hexylhydrocortisone, 1-dehydro-6α-isobutylhydrocortisone, 1-dehydro-6α-isopropylhydrocortisone, and the like.

PREPARATION 13

1-dehydro-6α-methylhydrocortisone acetate

A mixture was prepared containing 500 milligrams of 1-dehydro-6α-methylhydrocortisone in five milliliters of pyridine and five milliliters of acetic anhydride. The mixture was maintained at room temperature (22 to 24 degrees centigrade) for a period of six hours, thereupon poured into 100 milliliters of ice water and the resulting aqueous mixture extracted with three 25-milliliter portions of methylene chloride. The combined methylene chloride solutions were washed, dried over sodium sulfate and evaporated and the thus obtained residue recrystallized three times from acetone-Skellysolve B hexanes to give pure 1-dehydro-6α-methylhydrocortisone 21-acetate (6-methyl-11β,17α-dihydroxy-21-acetoxy-1,4-pregnadiene-3,20-dione).

PREPARATION 14

In the same manner as given in Example 13, treating in pyridine solution:

(a) 1-dehydro-6α-methylhydrocortisone with propionic anhydride yielded 1-dehydro-6α-methylhydrocortisone 21-propionate.

(b) 1-dehydro-6α-methylhydrocortisone with butyric anhydride yielded 1-dehydro-6α-methylhydrocortisone 21-butyrate.

(c) 1-dehydro-6α-methylhydrocortisone with valeric anhydride yielded 1-dehydro-6α-methylhydrocortisone 21-valerate.

(d) 1-dehydro-6α-methylhydrocortisone with hexanoyl bromide yielded 1-dehydro-6α-methylhydrocortisone 21-hexanoate.

(e) 1-dehydro-6α-methylhydrocortisone with octanoyl chloride yielded 1-dehydro-6α-methylhydrocortisone 21-octanoate.

(f) 1-dehydro-6α-methylhydrocortisone with benzoyl chloride yielded 1-dehydro-6α-methylhydrocortisone 21-benzoate.

(g) 1-dehydro-6α-methylhydrocortisone with phenylacetyl chloride yielded 1-dehydro-6α-methylhydrocortisone 21-phenylacetate.

(h) 6α-ethylhydrocortisone with acetic anhydride yielded 1-dehydro-6α-ethylhydrocortisone acetate.

In a manner similar to Preparations 13 and 14, other starting materials can be made by esterifying 1-dehydro-6-alkylhydrocortisone or 1-dehydro-6-arylhydrocortisone in pyridine solution with acyl halides or acid anhydrides. In similar manner the esters of 6-alkylhydrocortisone and 6-arylhydrocortisone can be prepared and may be used in the examples of the instant invention. Starting materials thus prepared include the acetates, propionates, butyrates, isobutyrates, valerates, isovalerates, hexanoates, heptanoates, octanoates, benzoates, phenylacetates, β-cyclopentylpropionates, phenylpropionates, laureates, hemisuccinates, tartrates, maleates, toluenesulfonates, and the like of 1-dehydro-6-alkylhydrocortisone and 1-dehydro-6-arylhydrocortisone wherein the alkyl group is methyl, ethyl, propyl, butyl, pentyl or hexyl and the aryl group may be phenyl or the like.

EXAMPLE 1

6α - methyl - 17α,21 - dihydroxy-1,4,9(11) - pregnatriene-3,20-dione 21-acetate

To a solution of 530 milligrams of 6α-methyl-11β,17α.21-trihydroxy-1.4-pregnadiene-3.20-dione 21-acetate (1-dehydro-6α-methylhydrocortisone 21-acetate) in five milliliters of pyridine, in an atmosphere of nitrogen, was added 225 milligrams of N-bromoacetamide. After standing at room temperature under nitrogen for a period of thirty minutes, the reaction solution was cooled to ten to fifteen degrees centigrade and, with shaking, sulfur dioxide gas was passed over the surface until the solution gave no color with acidified starch-iodine paper. During the addition of sulfur dioxide gas, the reaction became warm. The temperature was kept under thirty degrees centigrade by external cooling and by varying the rate of sulfur dioxide addition. After standing at room temperature for a period of fifteen minutes, the reaction mixture was poured into thirty milliliters of ice water and the resulting gummy precipitate extracted with fifty milliliters of ether. The ether extract was washed with five percent hydrochloric acid solution and water, dried over anhydrous sodium sulfate, and evaporated to dryness to give 371 milligrams of material. This material was recrystallized from acetone-Skellysolve B hexanes to give 318 milligrams of 6α-methyl-17α,21-dihydroxy-1,4,9(11)-pregnatriene-3,20-dione 21-acetate of melting point 188 to 191.5 degrees centigrade.

EXAMPLE 2

6α - methyl - 9α - bromo - 11β,17α,21 - trihydroxy - 1,4-pregnadiene-3,20 - dione 21 - acetate (1 - dehydro - 6α-methyl-9α-bromohydrocortisone 21-acetate)

To a solution of 332 milligrams of 6α-methyl-17α,21-dihydroxy-1,4,9(11)-pregnatriene-3,20-dione 21-acetate in five milliliters of methylene chloride and 9.9 milliliters of tertiary butyl alcohol was added a solution of 0.83 milliliter of 72 percent perchloric acid in 5.8 milliliters of water followed by a solution of 142 milligrams of N-bromoacetamide in 2.5 milliliters of tertiary butyl alcohol. After stirring the reaction mixture for fifteen minutes, a solution of 142 milligrams of sodium sulfite in seven milliliters of water was added and the reaction mixture was concentrated to a volume of about 25 milliliters under reduced pressure at about sixty degrees centigrade. At this point crystallization started. The concentrate was cooled in an ice bath while stirring and 35 milliliters of water was added. After stirring for a period of twenty minutes, the crystalline product was isolated by filtration, the crystals were washed with water and air-dried to give 406 milligrams of 6α-methyl-9α-bromo-11β,17α,21 - trihydroxy - 1,4 - pregnadiene - 3,20 - dione 21-acetate (1-dehydro-6α-methyl-9α-bromohydrocortisone 21-acetate) of melting point 173 to 177 degrees centigrade (with decomposition).

EXAMPLE 3

6α - methyl - 9β,11β - oxido - 17α,21 - dihydroxy - 1,4-pregnadiene-3,20-dione 21-acetate To a solution of 406 milligrams of 6α-methyl-9α-bromo - 11β,17α,21 - trihydroxy - 1,4 - pregnadiene - 3,20-dione 21-acetate in fifteen milliliters of acetone was added 406 milligrams of potassium acetate and the resulting suspension was heated under reflux for a period of eighteen hours. The mixture was then concentrated to five milliliters of volume on the steam bath and thereupon ten milliliters of water was added. This caused the potassium acetate to go into solution and the steroidal product to crystallize out. The product was separated by filtration and recrystallized from acetone to give in two crops 232 milligrams of 6α-methyl-9β,11β-oxido-17α,21-dihydroxy-1,4-pregnadiene-3,20-dione 21-acetate of melting point 255 to 263 degrees centigrade.

EXAMPLE 4

6α - methyl - 9α - fluoro - 11β,17α·21 - trihydroxy - 1·4-pregnadiene - 3,20 - dione 21 - acetate (1 - dehydro-6α-methyl-9α-fluorohydrocortisone 21-acetate)

To a solution of 230 milligrams of 6α-methyl-9β,11β-oxido-17α,21-dihydroxy-1,4 - pregnadiene-3,20-dione 21-acetate in five milliliters of methylene chloride was added 1.2 milliliters of 48 percent solution of hydrogen fluoride. The two-phase mixture was stirred for a period of twenty hours, then diluted with fifteen milliliters of methylene chloride and carefully poured into forty milliliters of water containing four grams of sodium bicarbonate. After shaking to neutralize the excess hydrogen fluoride, the methylene chloride was separated and the water phase was extracted with more methylene chloride. The combined methylene chloride solution (about 75 milliliters) was dried over anhydrous sodium sulfate, diluted with 25 milliliters of ether and chromatographed over twenty grams of Florisil synthetic magnesium silicate. The column was eluted as follows:

TABLE I

| Fraction No. | Solvent |
| --- | --- |
| 1 (100 milliliters) | Methylene chloride-ether (3:1). |
| 2–6 (40 milliliters each) | Skellysolve B hexane+acetone (12%). |
| 7–16 (40 milliliters each) | Skellysolve B hexane+acetone (15%). |
| 16–21 (40 milliliters each) | Skellysolve B hexane+acetone (20%). |
| 21–26 (40 milliliters each) | Skellysolve B hexane+acetone (25%). |
| 27–39 (40 milliliters each) | Skellysolve B hexane+acetone (50%). |

Fractions 2 to 13, inclusive, containing a total of 140 milligrams, were combined, evaporated and the residue thus obtained recrystallized from acetone-Skellysolve B hexane and from methylene chloride to give 89 milligrams of 6α-methyl-9α-fluoro-11β,17α,21-trihydroxy-1,4-pregnadiene-3,20-dione 21-acetate (1-dehydro-6α-methyl-9α-fluorohydrocortisone 21-acetate) of melting point 233 to 237 degrees centigrade. The ultraviolet absorption is as follows:

$$\lambda 238.5 \text{ m}\mu; a_M = 15,325.$$

The infrared absorption measured in Nujol mineral oil is as follows: hydroxyl, 3430 cm.$^{-1}$; 21-acetoxy-20-keto, 1735, 1717 cm.$^{-1}$; conjugated 3-keto group, 1658 cm.$^{-1}$; $\Delta^{1,4}$-double bonds, 1615, 1610 cm.$^{-1}$; acetate C—O —bond, 1270, 1239 cm.$^{-1}$.

EXAMPLE 5

*6α-methyl-9α-fluoro-17α,21-dihydroxy-1,4-pregnadiene-3,11,20-trione 21-acetate (1-dehydro-6α-methyl-9α-fluorocortisone 21-acetate)*

A solution was prepared containing in one milliliter of acetic acid fifty milligrams of 6α-methyl-9α-fluoro-11β,17α,21-trihydroxy-1,4-pregnadiene-3,20-dione 21-acetate, twenty milligrams of chromic anhydride and one drop (approximately fifty milligrams) of water. This mixture was shaken several times at room temperature and allowed to stand for four hours. Thereafter it was poured into ten milliliters of water and refrigerated for twenty hours at about five degrees centigrade. The steroid which separated from the aqueous mixture was collected on filter paper and recrystallized two times from acetone to give 6α-methyl-9α-fluoro-17α,21-dihydroxy-1,4-pregnadiene-3,11,20-trione 21-acetate (1-dehydro-6α-methyl-9α-fluorocortisone 21-acetate).

EXAMPLE 6

*6α-methyl-9α-fluoro-11β,17α,21-trihydroxy-4-pregnene-3,20-dione 21-acetate*

In the same manner as shown in Example 1, 6α-methyl - 11β,17α,21 - trihydroxy - 4 - pregnene - 3,20 - dione 21-acetate was treated with N-chlorosuccinimide to give the corresponding intermediate hypochlorite, i.e., 6α - methyl - 11β,17α,21 - trihydroxy - 1,4 - pregnadiene-3,20-dione 11β-hypochlorite 21-acetate, which was then treated with gaseous sulfur dioxide to give 6α-methyl-17α,21-dihydroxy-4,9(11)-pregnadiene-3,20-dione 21-acetate.

Treating the thus-obtained 6α-methyl-17α,21-dihydroxy-4,9(11)-pregnadiene-3,20-dione 21-acetate with N-chloroacetamide in the presence of aqueous perchloric acid as shown in Example 2 yielded the 6α-methyl-9α-chloro - 11β,17α,21 - trihydroxy - 4 - pregnene - 3,20-dione 21-acetate.

Treating the thus-obtained 6α-methyl-9α-chloro-11β,17α,21 - trihydroxy - 4 - pregnene - 3,20 - dione 21-acetate with potassium acetate in acetone solution under reflux conditions, as shown in detail in Example 3, gave the corresponding 6α - methyl - 9β,11β - oxido - 17α,21-dihydroxy-4-pregnene-3,20-dione 21-acetate.

Treating the thus-obtained 6α-methyl-9β,11β-oxido-17α,21 - dihydroxy - 4 - pregnene - 3,20 - dione 21-acetate with hydrogen fluoride in chloroform solution produced the 6α - methyl - 9α - fluoro - 11β,17α,21-trihydroxy-4-pregnene-3,20-dione 21-acetate.

EXAMPLE 7

*6α - methyl - 9α - fluoro - 17α,21 - dihydroxy - 4 - pregnene-3,11,20-trione 21-acetate*

Oxidizing in the manner shown in Example 5 6α-methyl - 9α - fluoro - 11β,17α,21 - trihydroxy - 4 - pregnene-3,20-dione 21-acetate with chromic anhydride produces the 6α - methyl - 9α - fluoro - 17α,21 - dihydroxy - 4-pregnene-3,11,20-trione 21-acetate (6α-methyl-9α-fluorocortisone 21-acetate).

In the same manner as given in Examples 1 through 7 but using as starting material the corresponding 6β-isomers in the sequence illustrated in particular by Examples 1 through 5, are obtained 6β-methyl-9α-fluoro-11β,17α,21 - trihydroxy - 1,4 - pregnadiene - 3,20 - dione 21 - acetate, 6β - methyl - 9α - fluoro - 17α,21 - dihydroxy - 1,4 - pregnadiene - 3,11,20 - trione 21 - acetate, 6β - methyl - 9α - fluoro - 11β,17α,21 - trihydroxy - 4-pregnene - 3,20 - dione 21 - acetate, 6β - methyl - 9α-fluoro - 17α,21 - dihydroxy - 4 - pregnene - 3,11,20-trione 21-acetate. Using instead of the acetates, other esters as starting materials in the series exemplified by Examples 1 through 5, such as propionate, butyrate, isobutyrate, valerate, benzoate, hexanoate, heptanoate, octanoate, phenylacetate, phenylpropionate, laurate, or the like of 6α- or 6β-methylhydrocortisone or 1-dehydro-6α- or 6β-methylhydrocortisone yields the corresponding esters of 6α- or 6β-methyl-9α-fluorohydrocortisone or of 1-dehydro-6α-methyl 9α-fluorohydrocortisone and -cortisone. Instead of the 6α-methylhydrocortisone and 1-dehydro-6α-methylhydrocortisone, other 1-dehydro-6-alkyl- and 1-dehydro-6-arylhydrocortisones can be used to give by the sequence of steps illustrated in Examples 1 through 5 the corresponding 6α-alkyl-9α-fluorohydrocortisone esters, or respectively the 1-dehydro-6α-aryl-9α-fluorohydrocortisone esters and the 11-keto analogues, i.e., 1-dehydro-6α-alkyl-9α-fluorocortisone esters and 1-dehydro-6α-aryl-9α-fluorocortisone esters, wherein the alkyl groups can be ethyl, propyl, isopropyl, butyl, isobutyl, pentyl, hexyl and the aryl group can be phenyl, benzyl or the like.

EXAMPLE 8

*6α - methyl - 9α - fluoro - 11β,17α,21 - trihydroxy - 1,4-pregnadiene - 3,20 - dione (1 - dehydro - 6α - methyl-9α-fluorohydrocortisone)*

100 milligrams of 6α-methyl-9α-fluoro-11β,17α,21-trihydroxy-1,4-pregnadiene-3,20-dione 21-acetate were dissolved in a solution consisting of two milliliters of methanol and 0.1 milliliter of water, previously purged of air-oxygen by passing nitrogen through it, and thereto was added fifty milligrams of potassium carbonate. The mixture was allowed to stand at room temperature for a period of six hours in a nitrogen atmosphere, thereupon neutralized with five percent aqueous hydrochloric acid solution, diluted with five milliliters of water and refrigerated. The mixture was then filtered and the soids recrystallized from acetone-Skellysolve B hexanes to give pure 6α-methyl-9α-fluoro-11β,17α,21-trihydroxy-1,4 - pregnadiene - 3,20 - dione (1 - dehydro - 6α-methyl-9α-fluorohydrocortisone).

EXAMPLE 9

*6α - methyl - 9α - fluoro - 17α,21 - dihydroxy - 1,4-pregnadiene - 3,11,20 - trione (1 - dehydro - 6α - methyl-9α-fluorocortisone)*

In the manner given in Example 8, hydrolyzing 6α-methyl - 9α - fluoro - 17α,21 - dihydroxy - 1,4 - pregnadiene - 3,11,20 - trione 21 - acetate with potassium hydroxide in methanol yielded the 6α-methyl-9α-fluoro-17α,21-dihydroxy-1,4-pregnadiene-3,11,20-trione (1-dehydro-6α-methyl-9α-fluorocortisone).

EXAMPLE 10

*6α-methyl-9α-fluoro-11β,17α,21-trihydroxy-4-pregnene-3,20-dione (6α-methyl-9α-fluoro-hydrocortisone)*

In the same manner given in Example 8, hydrolyzing 6α - methyl - 9α - fluoro - 11β,17α,21 - trihydroxy - 4-pregnene-3,20-dione 21-acetate with sodium hydroxide in a nitrogen atmosphere produces 6α-methyl-9α-fluoro-11β,17α,21-trihydroxy-4-pregnene-3,20-dione (6α-methyl-9α-fluorohydrocortisone).

EXAMPLE 11

6α-methyl-9α-fluoro-17α,21-dihydroxy-4-pregnene-3,11, 20-trione (6α-methyl-9α-fluorocortisone)

In the manner given in Example 8, hydrolyzing with sodium carbonate in ethanol solution in a nitrogen atmosphere 6α-methyl-9α-fluoro-17α,21-dihydroxy-4-pregnene-3,11,20-trione 21-acetate yielded 6α-methyl-9α-fluoro-17α,21-dihydroxy-4-pregnene-3,20-dione (6α-methyl-9α-fluorocortisone).

EXAMPLE 12

6α - methyl - 9α - fluoro - 11β,17α,21 - trihydroxy - 1,4-pregnadiene-3,20-dione 21-propionate (1-dehydro-6α-methyl-9α-fluorohydrocortisone 21-propionate)

A solution was prepared containing fifty milligrams of 6α - methyl - 9α - fluoro - 11β,17α,21 - trihydroxy - 1,4-pregnadiene-3,20-dione in one milliliter of pyridine and one milliliter of propionic anhydride. The solution was allowed to stand at room temperature for a period of 21 hours and was thereupon poured into ten milliliters of water. The reaction mixture was then extracted with three 10-milliliter portions of methylene chloride, the methylene chloride extracts were combined, washed with water, dried over anhydrous sodium sulfate and evaporated to give a residue which was recrystallized from ethyl acetate to give pure 6α-methyl-9α-fluoro-11β,17α,21-trihydroxy-1,4-pregnadiene-3,20-dione 21-propionate.

EXAMPLE 13

6α - methyl - 9α - fluoro - 11β,17α,21 - trihydroxy - 1,4-pregnadiene-3,20-dione 21-benzoate (1 - dehydro - 6α-methyl-9α-fluorohydrocortisone 21-benzoate)

A solution was prepared containing 6α-methyl-9α-fluoro - 11β,17α,21 - trihydroxy - 1,4 - pregnadiene - 3,20-dione in one milliliter of benzoyl chloride and two milliliters of pyridine. The mixture was allowed to stand overnight for a period of eighteen hours and was thereupon diluted with ten milliliters of water. The water solution was extracted three times with methylene chloride, the methylene chloride fractions combined, washed with water, dried over anhydrous sodium sulfate and evaporated to give a residue. This residue was recrystallized from methanol to give 6α-methyl-9α-fluoro-11β,17α,21-trihydroxy-1,4-pregnadiene-3,20-dione 21-benzoate.

EXAMPLE 14

6α - methyl - 9α - fluoro - 11β,17α,21 - trihydroxy - 1,4-pregnadiene-3,20-dione 21-hemisuccinate (1-dehydro-6α-methyl-9α-fluorohydrocortisone 21-hemisuccinate)

A solution was prepared containing 0.5 gram of succinic anhydride, 0.1 gram of 6α-methyl-9α-fluoro-11β,17α,21-trihydroxy-1,4-pregnadiene-3,20-dione in five milliliters of pyridine. The solution was allowed to stand overnight for a period of twenty hours, was thereupon diluted with water and the mixture refrigerated and filtered. The precipitate thus collected on filter paper was recrystallized two times from methanol to give 6α-methyl-9α - fluoro - 11β,17α,21 - trihydroxy - 1,4 - pregnadiene-3,20-dione 21-hemisuccinate.

EXAMPLE 15

6α - methyl - 9α - fluoro - 11β,17α,21 - trihydroxy - 1,4-pregnadiene-3,20-dione 21-hemisuccinate sodium salt (1-dehydro-6α-methyl-9α-fluorohydrocortisone 21-hemisuccinate sodium salt)

Sodium hydroxide solution (0.1 normal) was slowly added to a stirred solution of 100 milligrams of 6α-methyl - 9α - fluoro - 11β,17α,21 - trihydroxy - 1,4 - pregnadiene-3,20-dione 21-hemisuccinate, dissolved in two milliliters of acetone, until the pH rose to about 7.4. During the addition of sodium hydroxide solution, five milliliters of water was also added. The solution was then concentrated at 25 degrees centigrade under vacuum to remove the acetone. The resulting aqueous solution of 6α - methyl - 9α - fluoro - 11β,17α,21 - trihydroxy - 1,4-pregnadiene-3,20-dione 21-hemisuccinate sodium salt was filtered, freeze-dried and recrystallized to give pure 6α-methyl - 9α - fluoro - 11β,17α,21 - trihydroxy - 1,4 - pregnadiene-3,20-dione 21-hemisuccinate sodium salt.

EXAMPLE 16

In the same manner given in Examples 12 through 14, reacting in pyridine solution at room temperature (twenty to thirty degrees centigrade):

(a) 1-dehydro-6α-methyl-9α-fluorohydrocortisone with butyric anhydride yielded 1-dehydro-6α-methyl-9α-fluorohydrocortisone 21-butyrate.

(b) 1-dehydro-6a-methyl-9α-fluorohydrocortisone with valeric anhydride yielded 1-dehydro-6α-methyl-9α-fluorohydrocortisone 21-valerate.

(c) 1-dehydro-6α-methyl-9α-fluorohydrocortisone with lauryl chloride yielded 1-dehydro-6α-methyl-9α-fluorohydrocortisone 21-laurate.

(d) 1-dehydro-6α-methyl-9α-fluorohydrocortisone with phenylacetyl chloride yielded 1-dehydro-6α-methyl-9α-fluorohydrocortisone 21-phenylacetate.

(e) 1-dehydro-6α-methyl-9α-fluorohydrocortisone with phenylpropionyl bromide yielded 1-dehydro-6α-methyl-9α-fluorohydrocortisone 21-phenylpropionate.

(f) 1-dehydro-6α-methyl-9α-fluorohydrocortisone with β-cyclopentylpropionyl chloride yielded 1-dehydro-6α-methyl-9α-fluorohydrocortisone 21-(β-cyclopentylpropionate).

(g) 1-dehydro-6α-methyl-9α-fluorocortisone with propionic anhydride yielded 1-dehydro-6α-methyl-9α-fluorocortisone 21-propionate.

(h) 1-dehydro-6α-methyl-9α-fluorocortisone with valeric anhydride yielded 1-dehydro-6α-methyl-9α-fluorocortisone 21-valerate.

(i) 1-dehydro-6α-methyl-9α-fluorocortisone with benzoyl chloride yielded 1-dehydro-6α-methyl-9α-fluorocortisone 21-benzoate.

(j) 1-dehydro-6α-methyl-9α-fluorocortisone with phenylacetyl chloride yielded 1-dehydro-6α-methyl-9α-fluorocortisone 21-phenylacetate.

(k) 1-dehydro-6α-methyl-9α-fluorocortisone with undecylenyl chloride yielded 1-dehydro-6α-methyl-9α-fluorocortisone 21-undecylenate.

(l) 6α-methyl-9α-fluorohydrocortisone with propionyl anhydride yielded 6α-methyl-9α-fluorohydrocortisone 21-propionate.

(m) 6α-methyl-9α-fluorocortisone with propionyl anhydride yielded 6α-methyl-9α-fluorocortisone 21-propionate.

EXAMPLE 17

1-dehydro-6α-methyl-9α-fluorohydrocortisone 21-methanesulfonate

A solution was prepared containing 250 milligrams of 1-dehydro-6α-methyl-9α-fluorohydrocortisone in six milliliters of pyridine. This solution was cooled to zero degrees centigrade and treated with 0.25 milliliter of methanesulfonyl chloride. Thereafter the solution was allowed to stir at a temperature between zero and five degrees centigrade for a period of eighteen hours. Thereafter ice and two milliliters of water were added, followed by thirty milliliters of sufficient dilute (five percent) hydrochloric acid to neutralize the pyridine. The mixture was then filtered, the precipitate washed with water, and dried to give 197 milligrams of crude 6α - methyl - 9α - fluoro - 11β,17α,21 - trihydroxy - 1,4-pregnadiene-3,20 dione 21-methanesulfonate of melting point 165 to 185 degrees centigrade.

Rewashing this material several times with water gave 1 - dehydro - 6α - methyl - 9α - fluorohydrocortisone 21- methanesulfonate of melting point 200–210 degrees centigrade, rotation [α]$_D$ —92° (in pyridine) and $\lambda_{max.}^{alc.}$ 238+239 millimicrons, $E$=15,000

1-dehydro-6α-methyl-9α-fluorohydrocortisone 21-methanesulfonate is an interesting ester inasmuch as it has a high anti-inflammatory activity, measured in the granuloma pouch test and has no noticeable glucocorticoid activity. This split of activity makes this compound particularly valuable in the treatment of those arthritic patients where changes in the glycogen metabolism is undesirable.

The organic sulfonyl esters such as the 21-mesylate or the 21-tosylate are additionally useful as intermediates for the preparation of 6α-methyl-9α-fluoro-11β,17α-dihydroxy-1,4-pregnadiene-3.20-dione as shown in U.S. Patent No. 2,867,637.

Oxidation of 1-dehydro-6α-methyl-9α-fluorohydrocortisone 21-methanesulfonate in acetic acid solution with chromic anhydride at a temperature between minus ten and fifty degrees centigrade, preferably at room temperature, give the 1-dehydro-6α-methyl-9α-fluorocortisone 21-methanesulfonate which has anti-inflammatory activity.

In a manner similar to Examples 12 through 14 and 16, other esters of 1-dehydro-6α-methyl-9α-fluorohydrocortisone and 1-dehydro-6α-methyl-9α-fluorocortisone as well as esters of 6α-methyl-9α-fluorohydrocortisone and 6α-methyl-9α-fluorocortisone are prepared by reacting these steroids with the anhydride or acyl halides of organic carboxylic acids, particularly hydrocarbon carboxylic acids containing from one to twelve carbon atoms, inclusive. Representative 21-esters thus prepared include in particular, besides those of the before-mentioned examples, the butyrates, isobutyrates, valerates, isovalerates, hexanoates, heptanoates, octanoates, benzoates, phenylacetates, phenylpropionates, β-cyclopentylpropionates, tertiary butylacetates, toluates, 2-furoates, benzenesulfonates, toluenesulfonates, and the like of 1-dehydro-6α-methyl-9α-fluorohydrocortisone, 1-dehydro-6α-methyl-9α-fluorocortisone, 6α-methyl-9α-fluorohydrocortisone and 6α-methyl-9α-fluorocortisone. In the same manner 21-esters of the 6β-methyl epimers and the 21-esters of the 6α- and 6β-alkyl- and aryl analogues of these compounds can be prepared.

Treating the 1-dehydro-6-methyl-9α-halohydrocortisones and -cortisones, wherein the halogen atom is chlorine, bromine or iodine, with an acylating agent selected from halides or anhydrides of organic carboxylic acids, especially hydrocarbon carboxylic acids containing from one to twelve carbon atoms, inclusive, preferably at room temperature in pyridine solution produces the corresponding 21-esters of 1-dehydro-6-methyl-9α-halohydrocortisone and 1-dehydro-6-methyl-9α-halocortisone.

The starting 1dehydro-6-methyl-9α-halohydrocortisones and -cortisones wherein the halogen is chlorine, bromine or iodine are produced by procedures known in the art, such as reacting the 6-methyl-17α,21-dihydroxy-1,4,9(11)-pregnatriene-3,20-dione 21-ester (of Example 1) with N-bromo-, N-chloro- or N-iodosuccinimide in the presence of an acid as shown in Example 2 to give the corresponding 6α-methyl-9α-halo-11β,17α,21-trihydroxy-1,4-pregnadiene-3,20-dione 21-ester. Mild acid hydrolysis with dilute sulfuric acid at room temperature produces the corresponding free triol, 1-dehydro-6α-methyl-9α-halohydrocortisone.

Oxidation of the 6-methyl-9α-halo-11β,17α,21-trihydroxy-1,4-pregnadiene-3,20-dione 21-ester with chromic anhydride yields the 1-dehydro-6-methyl-9α-halocortisone 21-ester which by acid hydrolysis as mentioned above gives the free diol, 1-dehydro-6-methyl-9α-halocortisone.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A steroid selected from the group consisting of 1-dehydro-6-methyl-9α-fluorohydrocortisone, 1-dehydro-6-methyl-9α-fluorocortisone, 1-dehydro-6-methyl-9α-fluorohydrocortisone 21-acylate and 1-dehydro-6-methyl-9α-fluorocortisone 21-acylate wherein the acyl group is selected from the group consisting of acyl radicals of hydrocarbon carboxylic acids containing from one to twelve carbon atoms, inclusive, and methanesulfonic acid.

2. 1-dehydro-6α-methyl-9α-fluorohydrocortisone.

3. 1 - dehydro - 6α - methyl - 9α - fluorohydrocortisone 21-acetate.

4. 1 - dehydro - 6α - methyl - 9α - fluorohydrocortisone 21-methanesulfonate.

5. 1-dehydro-6α-methyl-9α-fluorocortisone.

6. 1-dehydro-6α-methyl-9α-fluorocortisone 21-acetate.

References Cited in the file of this patent
UNITED STATES PATENTS

| | | |
|---|---|---|
| 2,852,511 | Fried | Sept. 16, 1958 |
| 2,867,636 | Lincoln et al. | Jan. 6, 1959 |
| 2,903,449 | Fried et al. | Sept. 8, 1959 |